United States Patent
Curtiss et al.

(10) Patent No.: US 11,716,695 B2
(45) Date of Patent: Aug. 1, 2023

(54) EXCEPTION-ROBUST TIME-AVERAGED RADIO FREQUENCY EXPOSURE COMPLIANCE CONTINUITY

(71) Applicant: QUALCOMM Incorporated, San Diego, CA (US)

(72) Inventors: Troy Curtiss, Boulder, CO (US); Akhil Deodhar, Louisville, CO (US); Jagadish Nadakuduti, Mission Viejo, CA (US); Lin Lu, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/392,442

(22) Filed: Aug. 3, 2021

(65) Prior Publication Data
US 2022/0086770 A1    Mar. 17, 2022

Related U.S. Application Data

(60) Provisional application No. 63/077,377, filed on Sep. 11, 2020.

(51) Int. Cl.
*H04W 52/24*  (2009.01)
*H04L 1/00*   (2006.01)
*H04B 17/10*  (2015.01)
*H04W 52/22*  (2009.01)

(52) U.S. Cl.
CPC ........ *H04W 52/245* (2013.01); *H04B 17/101* (2015.01); *H04L 1/0061* (2013.01); *H04W 52/228* (2013.01)

(58) Field of Classification Search
CPC ..... H04W 52/18; H04W 52/34; H04W 52/50; H04W 52/241; H04W 52/44; H04W 52/38; H04W 72/0473; H04W 52/36; H04W 52/225; H04W 52/367; H04W 52/245;

(Continued)

(56) References Cited

U.S. PATENT DOCUMENTS 10,172,092 B1 *   1/2019   Zhou .......................... G06F 1/08
10,447,413 B1    10/2019   Nadakuduti et al.

(Continued)

FOREIGN PATENT DOCUMENTS

EP    2410661 A1    1/2012

OTHER PUBLICATIONS

International Search Report and Written Opinion—PCT/US2021/044553—ISA/EPO—dated Nov. 9, 2021.

*Primary Examiner* — Lana N Le
(74) *Attorney, Agent, or Firm* — Patterson+ Sheridan, L.L.P.

(57) ABSTRACT

Certain aspects of the present disclosure provide techniques for exception-robust time-averaged radio frequency (RF) exposure compliance continuity. A method that may be performed by a user equipment (UE) generally includes transmitting a first signal at a first transmission power based on time-averaged RF exposure measurements over a time window and storing RF exposure information associated with the time window. The method may also include detecting that an exception event associated with the UE occurred and transmitting a second signal at a second transmission power based at least in part on the stored RF exposure information in response to the detection of the event.

30 Claims, 8 Drawing Sheets

(58) Field of Classification Search
CPC ... H04W 52/228; H04B 17/101; H04L 1/0061
See application file for complete search history.

(56) References Cited

U.S. PATENT DOCUMENTS

| | | | |
|---|---|---|---|
| 2008/0182524 A1* | 7/2008 | Graesslin | H04B 17/23 455/73 |
| 2012/0021800 A1* | 1/2012 | Wilson | H04W 52/225 455/127.1 |
| 2013/0252658 A1 | 9/2013 | Wilson et al. | |
| 2014/0181594 A1* | 6/2014 | Sridharan | G06F 11/08 714/45 |
| 2014/0273886 A1* | 9/2014 | Black | H04B 1/3838 455/77 |
| 2017/0064641 A1* | 3/2017 | Logan | H04W 52/18 |
| 2017/0245224 A1* | 8/2017 | Barriac | H04W 52/343 |
| 2018/0076844 A1 | 3/2018 | Park et al. | |
| 2019/0124605 A1 | 4/2019 | Park et al. | |
| 2020/0015171 A1 | 1/2020 | Nadakuduti et al. | |
| 2020/0195290 A1* | 6/2020 | Khawand | H04W 52/367 |
| 2020/0374882 A1* | 11/2020 | Cai | H04W 72/0473 |
| 2022/0116949 A1* | 4/2022 | Nadakuduti | H04W 52/346 |
| 2022/0369237 A1* | 11/2022 | Cui | H04W 52/367 |

\* cited by examiner

EXCEPTION-ROBUST TIME-AVERAGED RADIO FREQUENCY EXPOSURE COMPLIANCE CONTINUITY

CROSS-REFERENCE TO RELATED APPLICATION(S)

The present Application for Patent claims priority to U.S. Provisional Application No. 63/077,377, filed Sep. 11, 2020, which is hereby expressly incorporated by reference herein in its entirety.

BACKGROUND

Field of the Disclosure

Aspects of the present disclosure relate to wireless communications, and more particularly, to techniques for providing radio frequency (RF) exposure compliance continuity.

Description of Related Art

Wireless communication systems are widely deployed to provide various telecommunication services such as telephony, video, data, messaging, broadcasts, etc. Modern wireless communication devices (such as cellular telephones) are generally required to meet radio frequency (RF) exposure limits set by domestic and international standards and regulations. To ensure compliance with the standards, such devices must currently undergo an extensive certification process prior to being shipped to market. To ensure that a wireless communication device complies with an RF exposure limit, techniques have been developed to enable the wireless communication device to assess RF exposure from the wireless communication device in real time and adjust the transmission power of the wireless communication device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include ensuring compliance with radio frequency exposure limits after various exception events.

Certain aspects of the subject matter described in this disclosure can be implemented in a method for wireless communication by a user equipment (UE). The method generally includes transmitting a first signal at a first transmission power based on time-averaged radio frequency (RF) exposure measurements over a time window and storing RF exposure information associated with the time window. The method may also include detecting that an exception event associated with the UE occurred and transmitting a second signal at a second transmission power based at least in part on the stored RF exposure information in response to the detection of the event.

Certain aspects of the subject matter described in this disclosure can be implemented in an apparatus for wireless communication. The apparatus generally includes a transmitter, a memory, and a processor. The transmitter is configured to transmit a first signal at a first transmission power based on time-averaged RF exposure measurements over a time window. The processor is coupled to the memory, such that the processor and the memory are configured to store RF exposure information associated with the time window, and detect that an exception event associated with the apparatus occurred. The transmitter is further configured to transmit a second signal at a second transmission power based at least in part on the stored RF exposure information in response to the detection of the event.

Certain aspects of the subject matter described in this disclosure can be implemented in an apparatus for wireless communication. The apparatus generally includes means for transmitting a first signal at a first transmission power based on time-averaged RF exposure measurements over a time window; means for storing RF exposure information associated with the time window; means for detecting that an exception event associated with the apparatus occurred; and means for transmitting a second signal at a second transmission power based at least in part on the stored RF exposure information in response to the detection of the event.

Certain aspects of the subject matter described in this disclosure can be implemented in a computer-readable medium having instructions stored thereon for transmitting a first signal at a first transmission power based on time-averaged RF exposure measurements over a time window; storing RF exposure information associated with the time window; detecting that an exception event associated with the UE occurred; and transmitting a second signal at a second transmission power based at least in part on the stored RF exposure information in response to the detection of the event.

Certain aspects of the subject matter described in this disclosure can be implemented in a method for wireless communication by a UE. The method generally includes transmitting a first signal at a first transmission power based on time-averaged RF exposure measurements over a time window; storing RF exposure information associated with the time window; detecting that an exception event associated with the UE occurred; determining that a timestamp corresponding to a most recent time-averaged RF exposure measurement is not within a current time window or determining that a check value does not pass a cyclic redundancy check (CRC) of the RF exposure information; and transmitting a second signal at a second transmission power in a failsafe mode based on the determining.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this dis

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
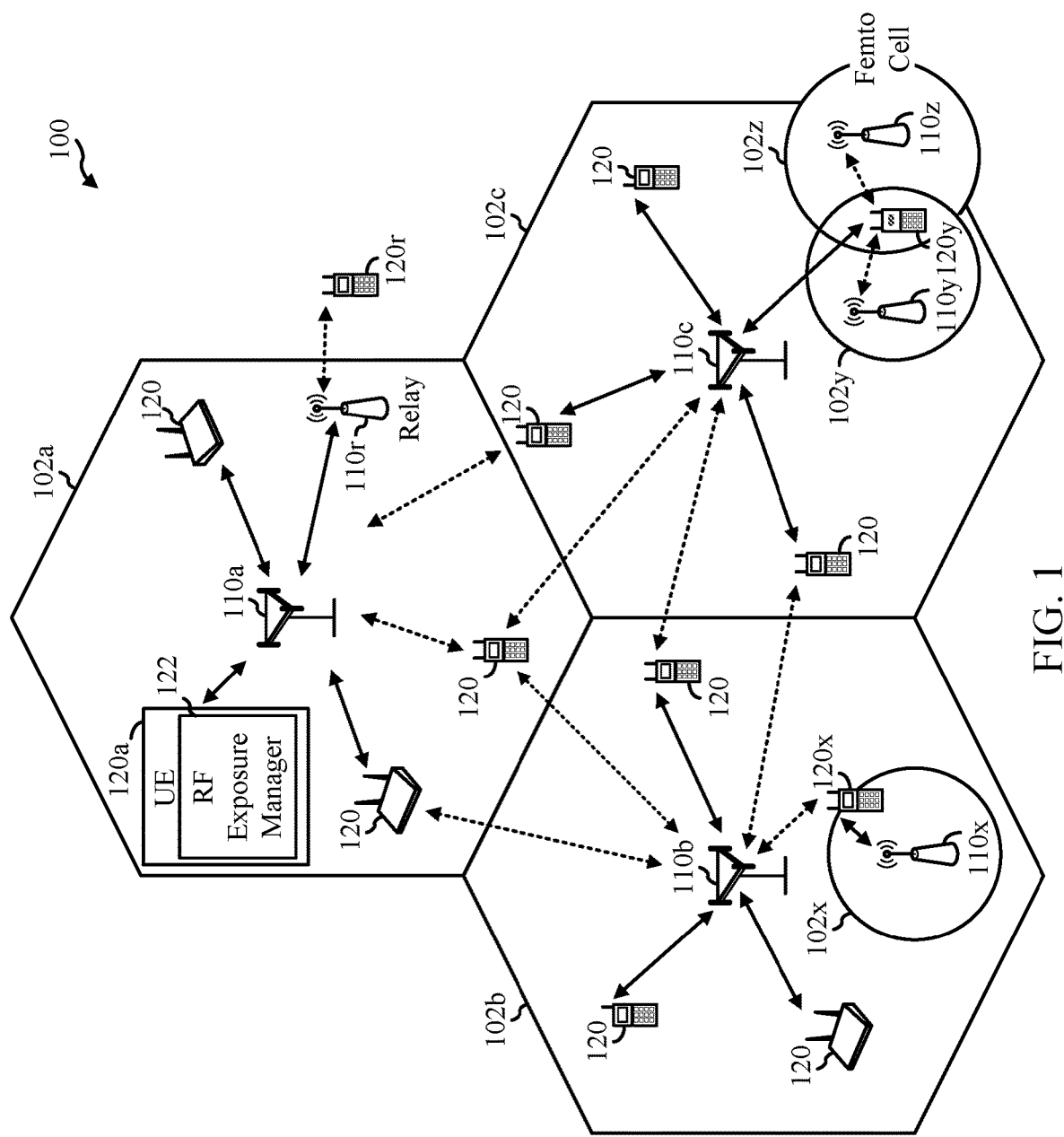
- FIG. 1 is a block diagram conceptually illustrating an example wireless communication network, in accordance with certain aspects of the present disclosure.
Figure 1:
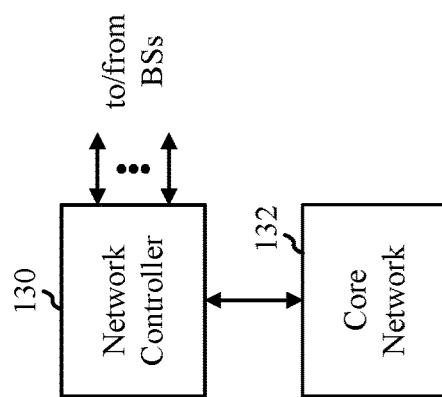

Aspects of the present disclosure provide apparatus, methods, processing systems, and computer-readable mediums for controlling radio frequency (RF) exposure after an exception event (such as an error, reset, crash, or reboot affecting the operations of a user equipment (UE) or a modem of the UE, or an event which results in a portion of time during which exposure is unknown or indeterminate or detection thereof). In certain aspects, a UE may periodically store RF exposure information (such as time-averaged RF exposure measurements of the transmit power history) in memory, preferably resistant to corruption from an exception event. When an exception event occurs (such as the UE rebooting or the UE's modem resetting, or the UE determining that a portion of time has elapsed during which exposure is unknown or indeterminate), the UE may use the stored RF exposure information to determine a transmit power in compliance with the RF exposure limit. The techniques for providing RF exposure continuity described herein may enable the UE to remain in compliance with the RF exposure limits without potentially exposing a user to excessive RF fields after the UE encounters an exception event. In other words, the techniques for providing RF exposure continuity described herein may provide safe operating conditions in terms of RF exposure for the user after an exception event. The techniques for providing RF exposure continuity described herein may provide a low-power solution that consumes an acceptable amount of power to store the RF exposure information without significantly affecting the battery life of the UE.

The following description provides examples of RF exposure compliance management in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, and/or may be associated with several RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or pursuant to other radio technologies (e.g., 802.11, Bluetooth, etc.).

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported, as may multi-layer transmissions. Aggregation of multiple cells may be supported.

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that provides RF exposure continuity (e.g., after an exception event), in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations or repeaters (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
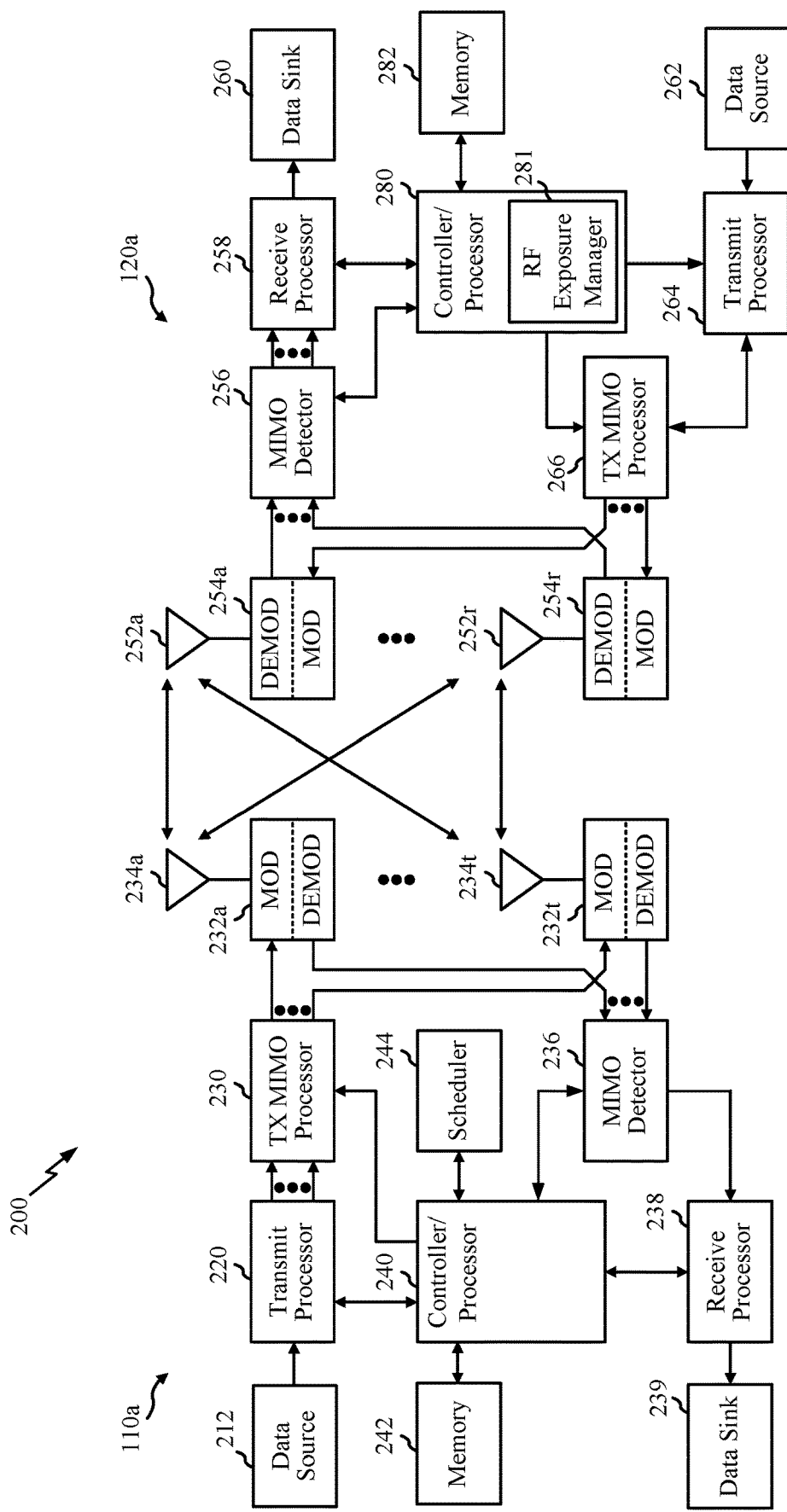
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators transceivers 232a-232t may be transmitted via the antennas 234a-234t, respectively.

At the UE 120a, the antennas 252a-252r may receive the downlink signal(s) from the BS 110a and may provide received signal(s) to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signal(s) from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 264, and/or controller/processor 280 of the UE 120a and/or antennas 234, processors 220, 230, and/or controller/processor 240 of the BS 110a may be used to perform the various techniques and methods described herein. As shown in FIG. 2, the controller/processor 280 of the UE 120a has an RF exposure manager 281 that provides RF exposure continuity (e.g., after an exception event), according to aspects described herein. The RF exposure manager 281 may be an example of the RF exposure manager 122 (FIG. 1). Although shown at the controller/processor, other components of the UE 120a and BS 110a may be used to perform the operations described herein. In some embodiments, the BS 110a (for example, the controller/processor 240) includes an exposure manager configured to provide RF exposure continuity for the BS 110a.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

Example RF Transceiver

Figure 3:
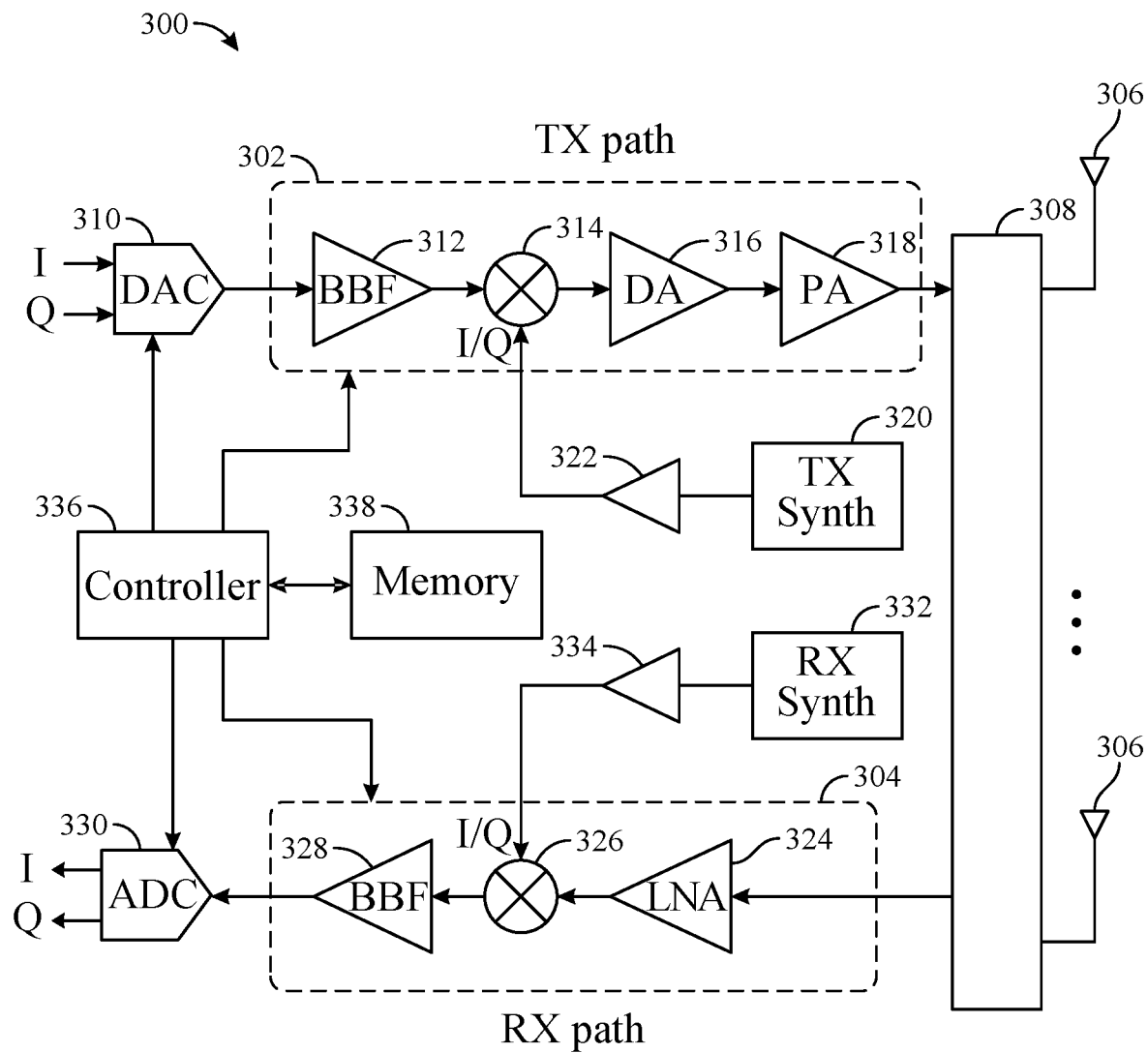
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. In some embodiments, the RF transceiver circuit 300 is an example of transceiver 232 and/or 254, or a portion thereof. The RF transceiver circuit 300 includes at least one transmit (TX) path 302 (also known as a transmit chain) for transmitting signals via one or more antennas 306 (which may be an example of the antennas 234 and/or 252) and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). In some embodiments, a mixer (e.g., 314), the DA 316, and/or the PA 318 may be included in an RFIC.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies (IF) and to thereafter upconvert the intermediate frequency signals to a frequency for transmission. Further, while examples discussed herein utilize I and Q signals, those of skill in the art will understand that elements of the RF transceiver circuit 300 may be configured to utilize polar modulation The RX path 304 may include a low noise amplifier (LNA) 324, a mixer 326, and a baseband filter (BBF) 328. The LNA 324, the mixer 326, and optionally the BBF 328 may be included in one or more RFICs, which may or may not be the same RFIC(s) that include the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing. While one mixer 326 is illustrated, several mixers may be used to downconvert the amplified RF signals to one or more intermediate frequencies and to thereafter downconvert the intermediate frequency signals to baseband.

Certain transceivers may employ frequency synthesizers with a voltage-controlled oscillator (VCO) to generate a stable, tunable LO signal with a particular tuning range. Thus, the transmit LO signal may be produced by a TX frequency synthesizer 320, which may be buffered or amplified by amplifier 322 before being mixed with the baseband (or IF) signals in the mixer 314. Similarly, the receive LO signal may be produced by an RX frequency synthesizer 332, which may be buffered or amplified by amplifier 334 before being mixed with the RF (or IF) signals in the mixer 326.

A controller 336 may direct the operation of the RF transceiver circuit 300, such as transmitting signals via the TX path 302 and/or receiving signals via the RX path 304. The controller 336 may be a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof. The controller 336 may be an example of the controller/processor 240 or 280, or a portion thereof, or may be implemented separate from the controller/processor 240, 280. The memory 338 may store data and program codes for operating the RF transceiver circuit 300. The memory 338 may be an example of the memory 242 or 282, or a portion thereof, or may be implemented separate from the memory 242, 282. The controller 336 and/or memory 338 may include control logic. In certain cases, the controller 336 may determine time-averaged RF exposure measurements based on transmission power levels set by the TX path 302 (e.g., certain levels of gain at the PA 318) to set a transmission power level for a time slot that complies with an RF exposure limit set by domestic and international regulations as further described herein.

Example RF Exposure Measurement

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm². In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter (W/m²) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 10 GHz, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

To assess RF exposure from transmissions using the first technology (e.g., 3G, 4G, 5G in sub-6 GHz bands, IEEE 802.11ac, etc.), the wireless communication device may include multiple SAR distributions for the first technology stored in memory (e.g., memory 242, 282 of FIG. 2 or memory 338 of FIG. 3). Each of the SAR distributions may correspond to a respective one of multiple transmit scenarios supported by the wireless communication device for the first technology. The transmit scenarios may correspond to various combinations of antennas (e.g., antennas 234a through 234t, 252a through 252r of FIG. 2 or antenna 306 of FIG. 3), frequency bands, channels and/or body positions, as discussed further below.

The SAR distribution (also referred to as a SAR map) for each transmit scenario may be generated based on measurements (e.g., E-field measurements) performed in a test laboratory using a model of a human body. After the SAR distributions are generated, the SAR distributions are stored in the memory to enable a processor (e.g., processor 240, 280 of FIG. 2 or controller 336 of FIG. 3) to assess RF exposure in real time, as discussed further below. Each SAR distribution includes a set of SAR values, where each SAR value may correspond to a different location (e.g., on the model of the human body). Each SAR value may comprise a SAR value averaged over a mass, for example 1 g or 10 g, at the respective location.

The SAR values in each SAR distribution correspond to a particular transmission power level (e.g., the transmission power level at which the SAR values were measured in the test laboratory). Since SAR scales with transmission power level, the processor may scale a SAR distribution for any transmission power level by multiplying each SAR value in the SAR distribution by the following transmission power scaler:

$$\frac{Tx_c}{Tx_{SAR}} \quad (1)$$

where $Tx_c$ is a current transmission power level for the respective transmit scenario, and $Tx_{SAR}$ is the transmission power level corresponding to the SAR values in the stored SAR distribution (e.g., the transmission power level at which the SAR values were measured in the test laboratory).

As discussed above, the wireless communication device may support multiple transmit scenarios for the first technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), a parameter indicating whether a device cover and/or type of device cover is positioned on the device, and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas to generate a SAR distribution for each one of the antennas. In this example, a SAR distribution for a transmit scenario in which two or more of the antennas are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

In certain aspects, a SAR distribution may be normalized with respect to a SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory may be normalized with respect to a SAR limit.

In certain aspects, the normalized SAR distribution for a transmit scenario may be generated by combining two or more normalized SAR distributions. For example, a normalized SAR distribution for a transmit scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \quad (2)$$

where $SAR_{lim}$ is a SAR limit, $SAR_{norm\_combined}$ is the combined normalized SAR distribution for simultaneous transmission from the active antennas, i is an index for the active antennas, $SAR_i$ is the SAR distribution for the $i^{th}$ active antenna, $Tx_i$ is the transmission power level for the $i^{th}$ active antenna, $Tx_{SARi}$ is the transmission power level for the SAR distribution for the $i^{th}$ active antenna, and K is the number of the active antennas.

Equation (2) may be rewritten as follows:

$$SAR_{norm\_combined} = \sum_{i=1}^{i=K} \frac{Tx_i}{Tx_{SARi}} \cdot SAR_{norm\_i} \quad (3a)$$

where $SAR_{norm\_i}$ is the normalized SAR distribution for the $i^{th}$ active antenna. In the case of simultaneous transmissions using multiple active antennas at the same transmitting frequency (e.g., multiple in multiple out (MIMO)), the combined normalized SAR distribution is obtained by summing the square root of the individual normalized SAR distributions and computing the square of the sum, as given by the following:

$$SAR_{norm\_combined\_MIMO} = \left[\sum_{i=1}^{i=K} \sqrt{\frac{Tx_i}{Tx_{SARi}} \cdot SAR_{norm\_i}}\right]^2. \quad (3b)$$

In another example, normalized SAR distributions for different frequency bands may be stored in the memory. In this example, a normalized SAR distribution for a transmit scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using Equation (3a) in which i is an index for the active frequency bands, $SAR_{norm\_i}$ is the normalized SAR distribution for the $i^{th}$ active frequency band, $Tx_i$ is the transmission power level for the $i^{th}$ active frequency band, and $Tx_{SARi}$ is the transmission power level for the normalized SAR distribution for the $i^{th}$ active frequency band.

To assess RF exposure from transmissions using the second technology (e.g., 5G in 24 to 60 GHz bands, IEEE 802.11ad, 802.11ay, etc.), the wireless communication device may include multiple PD distributions for the second technology stored in the memory (e.g., memory 242, 282 of FIG. 2 or memory 338 of FIG. 3). Each of the PD distributions may correspond to a respective one of multiple transmit scenarios supported by the wireless communication device for the second technology. The transmit scenarios may correspond to various combinations of antennas (e.g., antennas 234a through 234t, 252a through 252r of FIG. 2 or antenna 306 of FIG. 3), frequency bands, channels and/or body positions, as discussed further below.

The PD distribution (also referred to as PD map) for each transmit scenario may be generated based on measurements (e.g., E-field measurements) performed in a test laboratory using a model of a human body. After the PD distributions are generated, the PD distributions are stored in the memory to enable the processor (e.g., processor 240, 280 of FIG. 2 or controller 336 of FIG. 3) to assess RF exposure in real time, as discussed further below. Each PD distribution includes a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor may scale a PD distribution for any transmission power level by multiplying each PD value in the PD distribution by the following transmission power scaler:

$$\frac{Tx_c}{Tx_{PD}} \quad (4)$$

where $Tx_c$ is a current transmission power level for the respective transmit scenario, and $TX_{PD}$ is the transmission power level corresponding to the PD values in the PD distribution (e.g., the transmission power level at which the PD values were measured in the test laboratory).

As discussed above, the wireless communication device may support multiple transmit scenarios for the second technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), a parameter indicating whether a device cover and/or type of device cover is positioned on the device, and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas to generate a PD distribution for each one of the antennas. In this example, a PD distribution for a transmit scenario in which two or more of the antennas are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one. In these aspects, each of the PD distributions stored in the memory may be normalized with respect to a PD limit.

In certain aspects, the normalized PD distribution for a transmit scenario may be generated by combining two or more normalized PD distributions. For example, a normalized PD distribution for a transmit scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{i=1}^{i=L} \frac{Tx_i}{Tx_{PDi}} \cdot \frac{PD_i}{PD_{lim}} \quad (5)$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $TX_{PDi}$ is the transmission power level for the PD distribution for the $i^{th}$ active antenna, and L is the number of the active antennas.

Equation (5) may be rewritten as follows:

$$PD_{norm\_combined} = \sum_{i=1}^{i=L} \frac{Tx_i}{Tx_{PDi}} \cdot PD_{norm\_i} \quad (6a)$$

where $PD_{norm\_i}$ is the normalized PD distribution for the $i^{th}$ active antenna. In the case of simultaneous transmissions using multiple active antennas at the same transmitting frequency (e.g., MIMO), the combined normalized PD distribution is obtained by summing the square root of the individual normalized PD distributions and computing the square of the sum, as given by the following:

$$PD_{norm\_combined\_MIMO} = \left[\sum_{i=1}^{i=L} \sqrt{\frac{Tx_i}{Tx_{PDi}} \cdot PD_{norm\_i}}\right]^2. \quad (6b)$$

In another example, normalized PD distributions for different frequency bands may be stored in the memory. In this example, a normalized PD distribution for a transmit scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using Equation (6a) in which i is an index for the active frequency bands, $PD_{norm\_i}$ is the normalized PD distribution for the $i^{th}$ active frequency band, $Tx_i$ is the transmission power level for the $i^{th}$ active frequency band, and $TX_{PDi}$ is the transmission power level for the normalized PD distribution for the $i^{th}$ active frequency band.

As discussed above, the UE 120 may simultaneously transmit signals using the first technology (e.g., 3G, 4G, IEEE 802.11ac, etc.) and the second technology (e.g., 5G, IEEE 802.11ad, etc.), in which RF exposure is measured using different metrics for the first technology and the second technology (e.g., SAR for the first technology and PD for the second technology). In this case, the processor 280 may determine a first maximum allowable power level for the first technology and a second maximum allowable power level for the second technology for transmissions in a time slot that comply with RF exposure limits. During the time slot, the transmission power levels for the first and second technologies are constrained (i.e., bounded) by the determined first and second maximum allowable power levels, respectively, to ensure compliance with RF exposure limits, as further below. In the present disclosure, the term "maximum allowable power level" refers to a "maximum allowable power level" imposed by an RF exposure limit unless stated otherwise. It is to be appreciated that the "maximum allowable power level" is not necessarily equal to the absolute maximum power level that complies with an RF exposure limit and may be less than the absolute maximum power level that complies with the RF exposure limit (e.g., to provide a safety margin). The "maximum allowable power level" may be used to set a power level limit on a transmission at a transmitter such that the power level of the transmission is not allowed to exceed the "maximum allowable power level" to ensure RF exposure compliance.

The processor (e.g., 240, 280, 336) may determine the first and second maximum allowable power levels as follows. The processor may determine a normalized SAR distribution for the first technology at a first transmission power level, determine a normalized PD distribution for the second technology at a second transmission power level, and combine the normalized SAR distribution and the normalized PD distribution to generate a combined normalized RF exposure distribution (referred to simply as a combined normalized distribution below). The value at each location in the combined normalized distribution may be determined by combining the normalized SAR value at the location with the normalized PD value at the location or another technique.

The processor may then determine whether the first and second transmission power levels comply with RF exposure limits by comparing the peak value in the combined normalized distribution with one. If the peak value is equal to or less than one (i.e., satisfies the condition≤1), then the processor 280 may determine that the first and second transmission power levels comply with RF exposure limits (e.g., SAR limit and PD limit) and use the first and second transmission power levels as the first and second maximum allowable power levels, respectively, during the time slot. If the peak value is greater than one, then the processor may determine that the first and second transmission power levels do not comply with RF exposure limits. The condition for RF exposure compliance for simultaneous transmissions using the first and second technologies may be given by:

$$SAR_{norm} + PD_{norm} \leq 1 \qquad (7)$$

The normalized SAR distribution in equation (7) may be generated by combining two or more normalized SAR distributions as discussed above (e.g., for a transmit scenario using multiple active antennas). Similarly, the normalized PD distribution in equation (7) may be generated by combining two or more normalized PD distributions as discussed above (e.g., for a transmit scenario using multiple active antennas). In this case, the condition for RF exposure compliance in equation (7) may be rewritten using equations (3a) and (6a) as follows:

$$\sum_{i=1}^{i=K} \frac{Tx_i}{Tx_{SARi}} \cdot SAR_{norm\_i} + \sum_{i=1}^{i=L} \frac{Tx_i}{Tx_{PDi}} \cdot PD_{norm\_i} \leq 1. \qquad (8)$$

For the MIMO case, equations (3b) and (6b) may be combined instead. As shown in equation (8), the combined normalized distribution may be a function of transmission power levels for the first technology and transmission power levels for the second technology. All the points in the combined normalized distribution may meet the normalized limit of one in equation (8). Additionally, when combining SAR and PD distributions, the SAR and PD distributions may be aligned spatially or aligned with their peak locations so that the combined distribution given by equation (8) represents combined RF exposure for a given position of a human body.

Example Exception Robust Time Averaged RF Exposure Compliance Continuity

Time-averaged RF exposure compliance (e.g., SAR or MPE/PD) may provide desirable device performance, as well as ensure user safety at the device. In certain cases (such as normal runtime operations), the device (e.g., a UE) has an active system that ensures RF exposure compliance at all times, based upon varying time windows of power history. When the UE operation is halted by an exception condition (such as an assert, crash, or reset), and then the UE subsequently returns to normal runtime operations, the UE may lose all of the recent RF exposure history used to ensure time-averaged RF exposure compliance. For shorter RF exposure time windows (e.g., 4 seconds for NR Frequency Range (FR) 2), resetting the RF exposure history may be acceptable, since the time that the UE takes to reboot and begin a normal transmit operation may be longer than the time window over which power history is to be averaged. For certain transmission frequencies (e.g., NR FR1 and legacy 2/3/4G wireless wide area network (WWAN)), and depending upon the regulatory standard used, though, the time window can be longer (e.g., up to 360 seconds). Due to the longer time window for determining RF exposure compliance for certain transmission frequencies, the UE may start afresh with no transmit power history. As such, the lack of transmit power history may disrupt operation of the software/components ensuring RF exposure compliance. For example, in the absence of proper procedures the UE may transmit data using a transmit power that exceeds an RF exposure limit for the time window due to the lack of a transmit power history before the exception condition in the time window.

Aspects of the present disclosure provide various techniques for providing continuity of RF exposure information following various exception events (such as an error, reset, crash, or reboot affecting the operations of the UE or in particular a modem of the UE, and/or an event which results in a portion of time during which RF exposure is unknown or indeterminate). In certain aspects, the UE may periodically store RF exposure information (such as transmit power and/or time-averaged RF exposure measurements of the transmit power history) in memory resistant to corruption from an exception event. When an exception event occurs (such as the UE rebooting or the UE's modem resetting, or an event which causes the UE to experience or detect an amount of time during which RF exposure information is unknown or indeterminate), the UE may use the stored RF exposure information to determine a transmit power in compliance with the RF exposure limit. The techniques for providing RF exposure continuity described herein may enable the UE to remain in compliance with the RF exposure limits after the UE encounters an exception event and/or may allow the UE to transmit at a higher power in certain such circumstances while maintaining safety for the user after an exception event. The techniques for providing RF exposure continuity described herein may provide a low-power solution that consumes an acceptable amount of power to store the RF exposure measurements without significantly affecting the battery life of the UE. In certain cases, the techniques for providing RF exposure continuity described herein may facilitate desirable power consumption, for example, due to relatively high transmit powers (e.g., exceeding the RF exposure limit) used before the exception event when taking into account the stored RF exposure information. In certain cases, the techniques for providing RF exposure continuity described herein may enable desirable transmit powers, for example, due to relatively low transmit powers (e.g., less than the RF exposure limit) used before the exception event when taking into account the stored RF exposure information.

Certain aspects of the present disclosure involve using a UE's onboard power management integrated circuit (PMIC), which may include a counter. In certain cases, the counter may be based on a real-time clock (RTC). The RTC may monotonically count upward, even when the UE resets or power is momentarily lost. The RTC may allow the UE software to periodically take a snapshot of the transmit power history using the PMIC RTC timestamp, and save the transmit power history in internal static memory that is resistant to corruption due to an exception event. Upon or shortly after a reset, the UE software may check the memory location in internal static memory for an RTC timestamp, optionally a consistency/reliability indicator (e.g., a checksum, such as a cyclic redundancy check (CRC)), and data (e.g., a CRC-protected set of data) indicating the recent transmit power history. If the CRC passes, for example, the current (post-reset) RTC timestamp is used to determine how old the transmit power history is, and the UE's compliance algorithm transmit power history bookkeeping is updated accordingly. The techniques for providing RF exposure continuity described herein may ensure compliance at all times, even across unexpected resets or other exception events (e.g., if recent records of exposure are lost or unknown for any reason). If the CRC passes, but the timestamp is old enough to not fall within the longest time-averaging window, the transmit power history may not be used. If the CRC fails, the UE may enter a failsafe mode where the transmit power is restricted for the initial duration of the longest window, ensuring compliance at a cost of initial performance.

Figure 4:
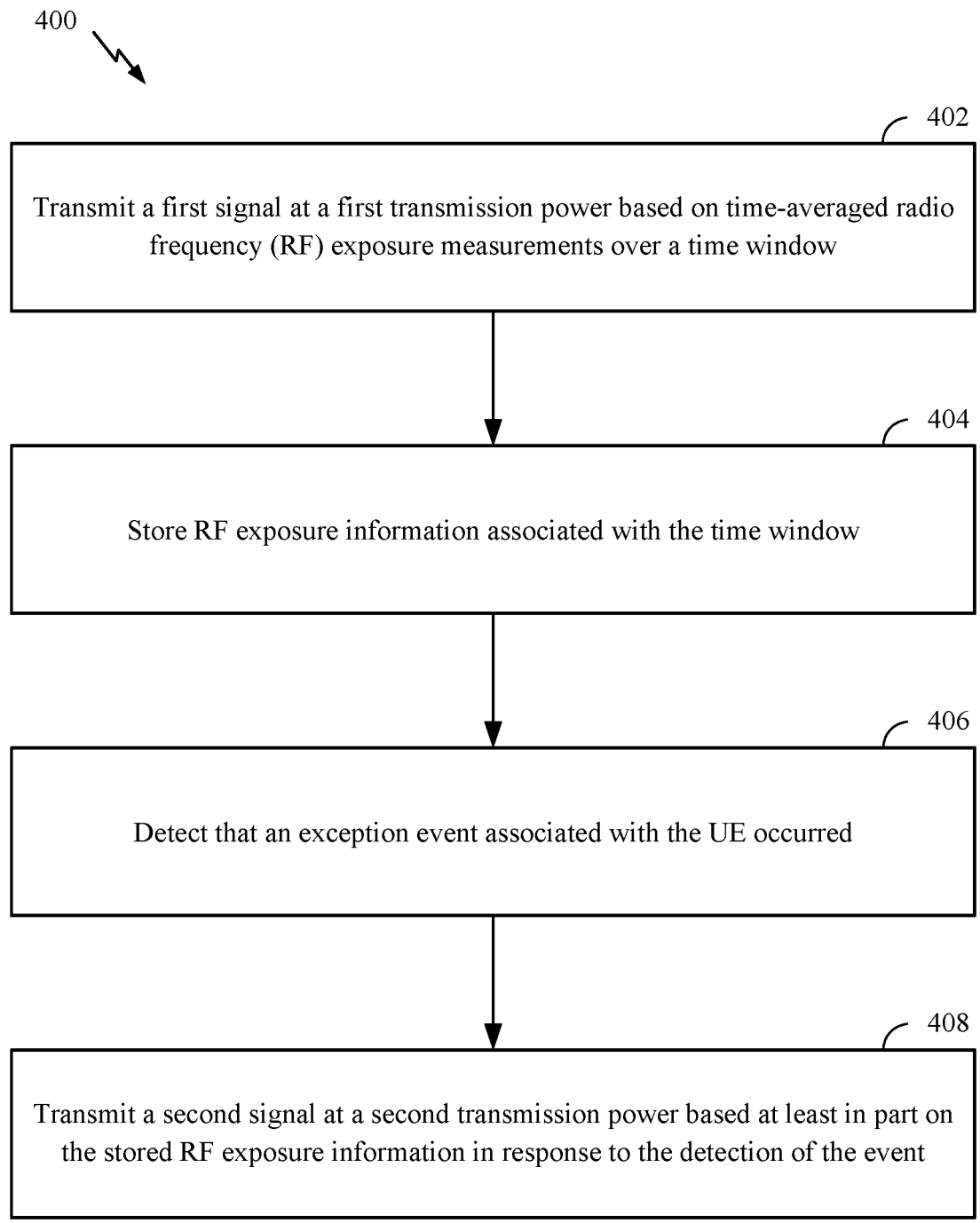
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., the UE 120a in the wireless communication network 100), BS, or Customer Premises Equipment (CPE). The operations 400 may be implemented as software components that are executed and run on one or more processors (e.g., controller/processor 240, 280 of FIG. 2, controller 336 of FIG. 3). Further, the transmission of signals by the UE (or BS, CPE) in the operations 400 may be enabled, for example, by one or more antennas (e.g., antennas 234, 252 of FIG. 2, antenna 306 of FIG. 3). In certain aspects, the transmission and/or reception of signals by the UE may be implemented via a bus interface of one or more processors (e.g., controller/processor 240, 280, controller 336 of FIG. 3) obtaining and/or outputting signals.

The operations 400 may begin, at block 402, where the UE may transmit a first signal at a first transmission power based on time-averaged RF exposure measurements over a time window. At block 404, the UE may store RF exposure information associated with the time window. At block 406, the UE may detect that an exception event associated with the UE occurred. At block 408, the UE may transmit a second signal at a second transmission power based at least in part on the stored RF exposure information in response to the detection of the event.

In aspects, the UE (for example using components described in FIGS. 2 and/or 3, and potentially in combination with the RF exposure manager 122, 281) may be communicating with a base station, such as the BS 110. For example, at block 402 and/or block 408, the UE may be transmitting, to the base station, user data on a physical uplink shared channel (PUSCH) or various uplink feedback (e.g., uplink control information or hybrid automatic repeat request (HARQ) feedback) on a physical uplink control channel (PUCCH). In certain cases, the UE may be communicating with another UE. For example, at block 402 and/or block 408, the UE may be transmitting, to the other UE, user data and/or various feedback on sidelink channels.

In aspects, the RF exposure information may include a history of transmission powers and/or time-averaged RF exposure measurements. In certain cases, the RF exposure information may include a sum of the time-averaged RF exposure measurements, a sum of the transmission powers within the time window at a time corresponding to a timestamp, or an integration of transmit powers over time. In certain cases, the RF exposure information may include separate values for each of the time-averaged RF exposure measurements or the transmission powers within the time window at the time corresponding to the timestamp.

At block 404, the UE (e.g., the RF exposure manager 122, 281) may periodically store the RF exposure information. That is, the UE may store the RF exposure information according to a period, such as every 50 milliseconds (ms), 500 ms, or 1 second (s). In other words, the UE may store the RF exposure information at periodic intervals, for example, of 50 ms, 500 ms or 1 s.

At block 404, the UE may store the RF exposure information in a memory resistant to corruption from the exception event. That is, the memory may be configured to store data (such as the RF exposure information) before or as the exception event occurs, where the exception event does not corrupt the stored data. In certain cases, the UE may store the RF exposure information as the exception event occurs, for example, when the UE may still be transmitting during the exception event. For example, the memory may be non-volatile memory or static memory separate from memory used for a file system, as further described herein with respect to FIG. 6. In certain cases, the memory used for the file system may consume too much power to provide a low-power memory solution for storing the RF exposure information. In certain aspects, however, the RF exposure information may be stored in the memory used for the file system.

At block 404, the UE may store the RF exposure information with a timestamp. The timestamp may correspond to a time (e.g., an absolute or relative time) when a most recent time-averaged RF exposure measurement is generated or when the (most) recent transmission is sent by the UE. In other words, the RF exposure information may include the (most) recent time-averaged RF exposure measurement or the (most) recent transmit power history.

In aspects, the timestamp associated with the RF exposure information may be used to determine whether to use the RF exposure information in determining the second transmission power for the second signal. For example, at block 408, the UE may transmit the second signal at the second transmission power based at least in part on the stored RF exposure information if the timestamp of the RF exposure information is within a current time window (e.g., in response to determining that the timestamp of the RF exposure information is within a current time window), where the current time window may look backwards in time starting at a current timestamp, for example, corresponding to when the UE recovers from the exception event. In other words, if the timestamp of the RF exposure information is outside the current time window, the UE may not consider the RF exposure information in determining the second transmission power for the second signal. In certain cases, the UE may determine a time delta between the timestamp of the RF exposure information and a current timestamp (for example, corresponding to when the UE recovers from the exception event), and if the time delta is greater than (or equal to) the duration of the (current or longest) time window, the UE may not consider the RF exposure information in determining the second transmission power for the second signal. Otherwise, if the time delta is less than (or equal to) the duration of the (current or longest) time window, the UE may use the RF exposure information in determining the second transmission power for the second signal. As described above, the time window may vary based on frequency and/or regulation/standard; thus, a certain time delta may correspond to the UE using the RF exposure information in determining the second transmission power for the second signal in certain scenarios (e.g., transmission frequency, geographic location, etc.) and may correspond to the UE ignoring the RF exposure information in other scenarios.

In certain aspects, storing the RF exposure information may involve obtaining the timestamp from a counter or a clock. For example, the UE may obtain the timestamp from a counter resistant to corruption by the exception event. The counter may be resistant to the exception event by being able to continue providing timestamps independent of the exception event. That is, the counter may continue to the count monotonically upward during the exception event without losing any increments in time. In certain cases, the counter may be based on a real-time clock.

As an example, suppose the UE reboots, and when the UE returns to normal operations, the UE checks whether the timestamp of the stored RF exposure information is within the current (or longest) time window. For example, the UE may obtain a current timestamp from the counter and compare the current timestamp with the timestamp of the RF exposure information. If the timestamp of the stored RF exposure information is within the current time window, the UE may use the stored RF exposure information in determining the second transmission power for the second signal. The UE may continue to use the RF exposure information to supplement RF exposure measurements until the timestamp is outside of the current time window. If the timestamp of the RF exposure information is outside the current time window (i.e., too much time has passed since the exception event), the UE may not use the stored RF exposure information in determining the second transmission power of the second signal.

In certain cases, the RF exposure information and/or timestamp may be stored with a check value or other reliability or fidelity indicator used to detect data inconsistencies, such as a cyclic redundancy check (CRC) or checksum. In certain cases, the check value may include a remainder in a CRC of the RF exposure information and/or timestamp.

In certain aspects, determining whether to use the RF exposure information may depend on the check value passing a CRC or confirming the fidelity of the RF exposure information based on the reliability indicator. For example, the UE may transmit the second signal at the second transmission power based on supplementing time-averaged RF exposure measurements over the current time window with the stored RF exposure information if the CRC of the RF exposure information matches the check value (e.g., in response to determining that the CRC of the RF exposure information matches the check value). In certain aspects, if the CRC of the RF exposure information passes, the RF exposure information may be used to determine the second transmission power for the second signal. If the CRC of the RF exposure information fails, the UE may enter a failsafe mode where a lower RF exposure limit than the standard RF exposure limit may be used to determine the transmission power for the second signal. For example, the failsafe mode may include using an assumed prior transmission power or exposure (e.g., a maximum transmission power or exposure over the duration of the earlier/prior part of the current time window) to determine the transmission power for the second signal in order to ensure safety for the user and compliance with any applicable exposure limits. In certain cases, the failsafe mode may be used if the RF exposure information is outside of the current time window when returning to normal operations after the exception event. In certain situations in which the transmission power for the second signal is based on the stored RF exposure information, however, the stored RF exposure information will indicate that the previous transmission power or exposure is less than would have been assumed in the failsafe mode, and thus, the transmission power for the second signal may be higher than would have been used in the failsafe mode while still maintaining safe operating conditions for the user.

In certain cases, the second transmission power at block 408 may be based on supplementing time-averaged RF exposure measurements with the stored RF exposure information. For example, suppose the time window is 100 seconds, such that the stored RF exposure information represents 100 seconds of transmission history. If the exception event only took 10 seconds, there is still 90 seconds of RF exposure information available to supplement new RF exposure measurements taken during normal operations after the exception event.

In certain cases, the second transmission power at block 408 may be based at least in part on the stored RF exposure information when at least one RF exposure measurement is missing from the time window. For example, the UE may lack RF exposure measurements due to the exception event. That is, the UE may be unable to communicate with other wireless communication devices and transmit signals during the exception event. The UE may lack a transmission power history during the exception event, and as a result, there may be RF exposure measurements missing from the time window.

In aspects, the UE may detect the exception event (at block 406) through various means. For example, the UE (e.g., the RF exposure manager 122, 281) may monitor certain logs, statistics, or an interface state (enabled or disabled) associated with one or more wireless communication components (such as a modem) of the UE to determine whether the UE has encountered an exception event. Certain messages (e.g., error messages or boot messages) in the logs may indicate that an exception event has occurred, the various transmit statistics (e.g., transmit packets or transmit bytes) resetting to zero may indicate an exception event occurred, or the modem switching from an enabled state (e.g., the modem is online and operational) to a disabled state (e.g., the modem is offline) may indicate an exception event occurred. In certain cases, the UE may monitor the modem for a specific interrupt that indicates an exception event has occurred. In some embodiments, the RF exposure manager is implemented in the modem, and the RF exposure manager may recognize that the modem was (temporarily) disabled by checking the logs or transmit statistics referenced above. Thus, software implemented separate from the modem may monitor the modem and/or operation thereof and perform the determination at block 406, or the modem may monitor itself to perform the determination at block 406. Such checks may be periodically performed (e.g., on the same order as the storage of the RF exposure information, such as every 50 ms, 500 ms or 1 s, or according to another period not related to the storage of the RF exposure information), performed based on certain occurrences (e.g., new data being loaded into a transmit buffer), etc.

In aspects, the exception event may include various events where the UE temporarily ceases communication or an event which results in a portion of time during which the UE's RF exposure is unknown or indeterminate. For example, the exception event may include the modem shutting down, the modem resetting, the modem rebooting, the modem crashing, or the modem encountering an error. In certain cases, the exception event may include an error, a reset, a crash, or a reboot affecting an operation of the UE or the modem used in transmitting the first and second signals. For example, the error, reset, crash, or reboot of the modem or another component may render the UE temporarily inoperable from a wireless communication standpoint or temporarily inoperable from tracking RF exposure. That is, the error, reset, crash, or reboot may prevent the UE from communicating wirelessly, such as transmitting signals from the UE's antenna(s), or from determining the RF exposure for a duration of time.

In aspects, the second transmission power at block 408 may be based on a type of exception event and/or a confidence in a likelihood of transmission during the portion of the time window corresponding to the missing RF exposure measurements. For example, if the RF exposure manager determines that communications (or at least transmissions) ceased during that portion of the time window (e.g., based on the messages, logs, statistics, etc. described above), the RF exposure manager may allocate zero transmission power to that portion of time when calculating the second transmission power. In other embodiments, the RF exposure manager allocates a minimum transmit power (e.g., a power required to maintain a certain link) to the portion of the time window corresponding to the missing RF exposure measurements, for example during conservative operation, when calculating the second transmission power. In other aspects, if it cannot be determined why an exception event occurred or that transmission ceased during the portion of the time window corresponding to the missing RF exposure measurements, the RF exposure manager may allocate a maximum allowable power level (or other predetermined transmit power) to that portion of time to calculate the second transmission power. In some aspects, a confidence level may be determined (e.g., based on data in a transmit buffer, transmit logs, communications received from another device, etc.) with respect to whether the device was transmitting during the portion of the time window corresponding to the missing RF exposure measurements, and the second transmission power determined based thereon. For example, comparison of the confidence level to a threshold may determine whether a zero or minimum transmission power level is allocated, or whether a maximum allowable power level (or other power level) is allocated to that portion of the time window. In some embodiments, a confidence level may be used to proportionally allocate transmission power to that portion of the time window.

In aspects, the time-averaged RF exposure measurements (e.g., stored at block 404) may include at least one of a time-averaged SAR or a time-averaged PD. In aspects, the time window may be in a range from 1 second to 360 seconds. For example, the time window may be 100 seconds or 360 seconds. The range from 1 second to 360 seconds is an example, and other suitable values for the time window may be used. In certain cases, the time window may be less than 1 second, such as 500 milliseconds. In certain cases, the time window may be greater than 360 seconds, such as 600 seconds.

Figure 5:
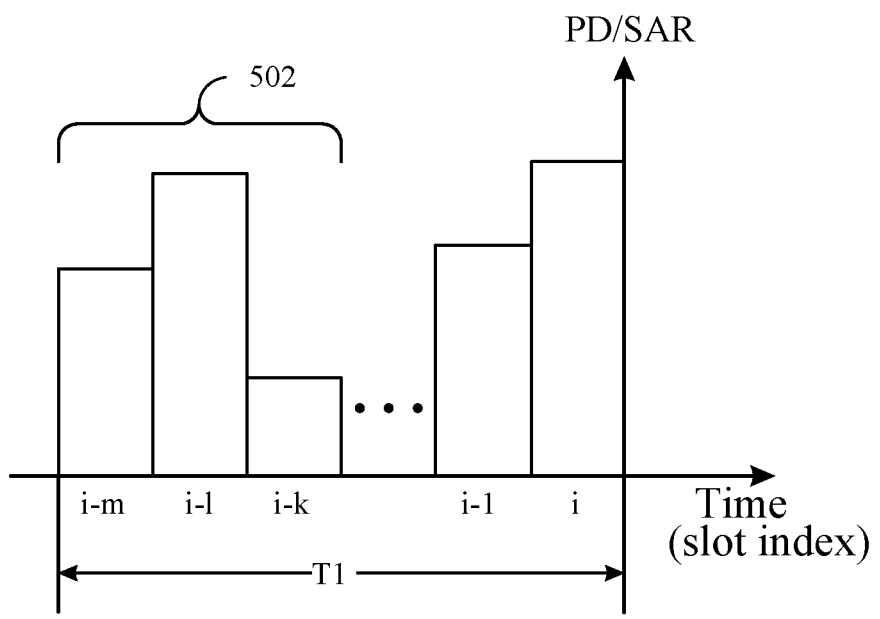
FIG. 5 is a diagram illustrating time-averaged RF exposure over a time window, in accordance with certain aspects of the present disclosure.

FIG. 5 is a diagram illustrating time-averaged RF exposure over a time window T1, in accordance with certain aspects of the present disclosure. The UE may determine the time-averaged RF exposure using time-averaged RF exposure measurements (for example, the various RF measurements corresponding to intervals (i) through (i–m)) across the time window T1. In certain cases, the UE may determine the RF exposure measurements based on a conversion model or scaling factor between SAR/PD and the transmission powers used at each transmission interval (such as intervals (i) through (i–m)).

In this example, the RF exposure measurements 502 may have been stored as RF exposure information prior to an exception event, for example, as described herein with respect to the operations 400. In aspects, the RF exposure information may have been stored as a sum of the RF exposure measurements 502 or as separate values for each of the RF exposure measurements 502. Within the time window T1, the UE may have encountered an exception event. After returning to normal operations or recovering from the exception event, the UE may use the RF exposure information to represent the RF exposure measurements prior to the exception event in determining the time-averaged RF exposure if the RF exposure information is within the time window T1. In this example, the RF exposure information is within the time window T1 (for example, the current time window may span from i–m to i), and as such, the UE may use the RF exposure information in determining a transmission power in compliance with the respective RF exposure requirements based on the time-averaged RF exposure. In certain cases, the UE may use a portion of the RF exposure information in determining the time-averaged RF exposure. For example, as the UE continues to determine the time-averaged RF exposure for the rolling time window T1 (for example, the current time window may advance (i.e., shift in time) by a time interval to span from i–1 to i+1), the UE may use a portion of the RF exposure information that corresponds to the remaining time intervals (e.g., intervals (i–1) and (i–k)) in the time window T1.

If the RF exposure information is outside the time window T1, the UE may not use the RF exposure information in determining the transmission power, and in certain cases, the UE may operate in a failsafe mode, for example, as described herein with respect to the operations 400. As an example, suppose a timestamp associated with the RF exposure information placed the RF exposure information outside the time window T1 at an interval (i–n). The UE may determine that the RF exposure information is outside the time window by comparing the timestamp associated with the RF exposure information with a timestamp associated with the current interval (i). As described herein, if the time delta between the timestamp associated with the RF exposure information and the timestamp associated with the current interval (i) is greater than or equal to the duration of the time window T1, the UE may not use the RF exposure information in determining the transmission power.

Figure 6:
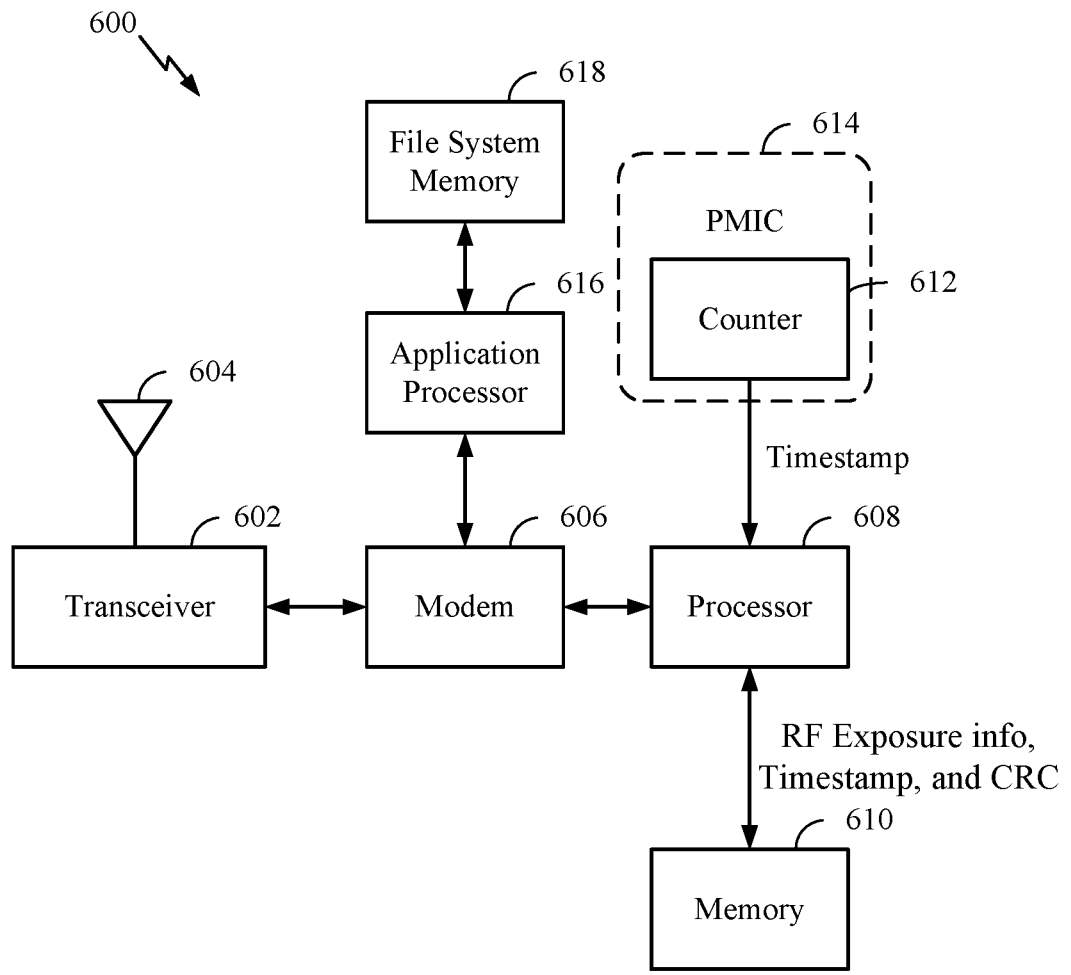
FIG. 6 is a block diagram illustrating a design of an example wireless communication device implementing RF exposure continuity, in accordance with certain aspects of the present disclosure.

FIG. 6 is a block diagram illustrating a design of an example wireless communication device 600 (e.g., the UE 120, BS 110) for implementing RF exposure continuity following an exception event, in accordance with certain aspects of the present disclosure. As shown, the wireless communication device 600 may include a transceiver 602 (which may be an example of the transceivers 232, 254, 300), one or more antennas 604 (which may be an example of the antennas 234, 252, 306), a modem 606, a processor 608, a memory 610 (which may be an example of the memory 242, 282, 338), and a counter 612. In certain cases, the counter 612 may be integrated with or included in a PMIC 614. In certain cases, the wireless communication device 600 may also include an application processor 616 and a file system memory 618. In some embodiments, one or both of the modem 606 and the processor 608 are implemented by or within components of FIG. 2 such as 212, 220, 230, 236, 238, 239, 240, 244, 256, 258, 260, 262, 264, 266, and/or 280, and/or controller 336 of FIG. 3. An RF exposure manager (e.g., 122, 281) may be implemented in the modem 606 and/or processor 608.

The wireless communication device 600 may transmit various signals from the transceiver 602 and the one or more antennas 604 coupled to the transceiver 602. The modem 606 may provide modulated signals to the transceiver 602 and provide instructions to the transceiver 602 to adjust the transmission power of the signals to comply with various RF exposure limits. For example, the modem 606 may provide, to the transceiver 602, instructions on the first transmission power and the second transmission power as described herein with respect to the operations 400. The processor 608 may obtain the current RF exposure information from the modem 606 and periodically store the RF exposure information in the memory 610 with a timestamp (and a CRC), as described herein with respect to the operations 400. In aspects, the memory 610 may be tightly coupled with the modem 606 and/or processor 608 and provide a lower power solution for repeatedly storing the RF exposure information compared to the file system memory 618. In certain aspects, the memory 610 may be resistant to corruption (e.g., electrically isolated from the modem 606 or certain components of the modem 606) due to an exception event affecting the operations of the wireless communication device 600 or modem 606. Those of skill in the art will understand that the exception event that triggers the use of the stored RF exposure information may be associated with other components that affect the operability of the wireless communication device 600, such as various circuitry, memory, or processors. In certain cases, the processor 608 and/or memory 610 may be integrated with the modem 606.

The processor 608 may obtain the timestamp from the counter 612, which may be integrated with the PMIC 614, such that the counter 612 may continue to keep time when the wireless communication device 600 is shutdown or rebooting, which in turn may trigger an exception event associated with the modem 606. For example, the PMIC 614 may provide a source of power for the counter 612 to continue keeping track of the time while the wireless communication device 600 is shut down (i.e., in an off state), resetting, or rebooting. In certain cases, the counter 612 may be based on a real-time clock (RTC), which may be integrated with the PMIC. When the wireless communication device 600 returns to a normal operating state or at least recovers from the exception event, the processor 608 may obtain the current timestamp from the counter 612 and compare the current timestamp with the timestamp stored with the RF exposure information to determine whether the timestamp is within a time window associated with an RF exposure limit. If the timestamp of the RF exposure information is within the time window (e.g., T1 of FIG. 5), the wireless communication device 500 may use the stored RF exposure information to determine a transmit power in compliance with an RF exposure limit.

The application processor 616 may be a processor included with a system-on-a-chip (SoC). For example, the application processor 616 may run an operating system that provides a graphical environment for a user to access various applications (such as a web browser, streaming applications, social media applications, etc.). The file system memory 618 may store the operating system, applications, and various user data. In aspects, the memory 610 may be non-volatile memory separate from the file system memory 618. In certain cases, the application processor 616 and file system memory 618 may store the RF exposure information as an alternative to or in addition to the processor 608 and memory 610. Further, in certain cases the counter 612 may be implemented on the SoC. For example, a global counter on the SoC that monotonically increases may be used when determining the timestamp. In some such cases, the counter on the SoC resets when the application processor 616 crashes or is otherwise stopped. In these cases, the RTC in the PMIC 614 may provide an advantage because the RTC will continue counting when the application processor 616 is disabled (e.g., due to a reboot, shutdown, etc.).

Figure 7:
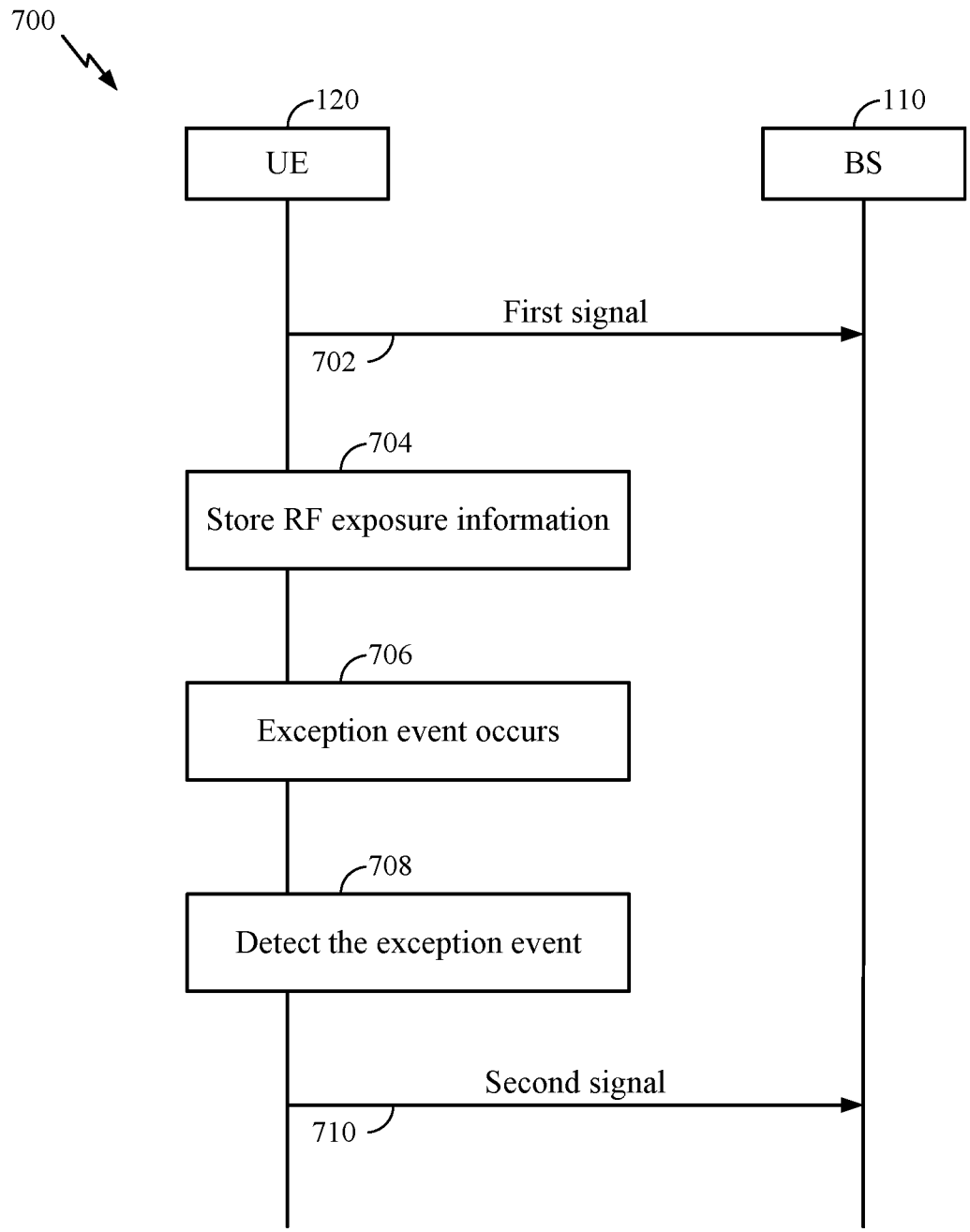
FIG. 7 is a signaling flow diagram illustrating example signaling for RF exposure continuity, in accordance with aspects of the present disclosure.

FIG. 7 is a signaling flow illustrating example operations for providing RF exposure continuity following an exception event, in accordance with certain aspects of the present disclosure. At 702, the UE 120 may transmit a first signal to the BS 110 at a first transmission power based on time-averaged RF exposure measurements over a time window (e.g., the time window T1 of FIG. 5). At 704, the UE 120 may periodically store RF exposure information associated with the time window. At 706, the UE 120 may encounter an exception event associated with the UE or a modem (e.g., the modem 606). For example, the UE 120 may reboot causing the modem to power cycle. In certain cases, the modem may crash or encounter an error, for example, due to a software bug or overheating. At 708, the UE 120 may detect that the exception event occurred, for example, as described herein with respect to the operations 400. At 710, the UE 120 may transmit a second signal at a second transmission power based at least in part on the stored RF exposure information in response to the detection of the event, for example, as described herein with respect to the operations 400.

Figure 8:
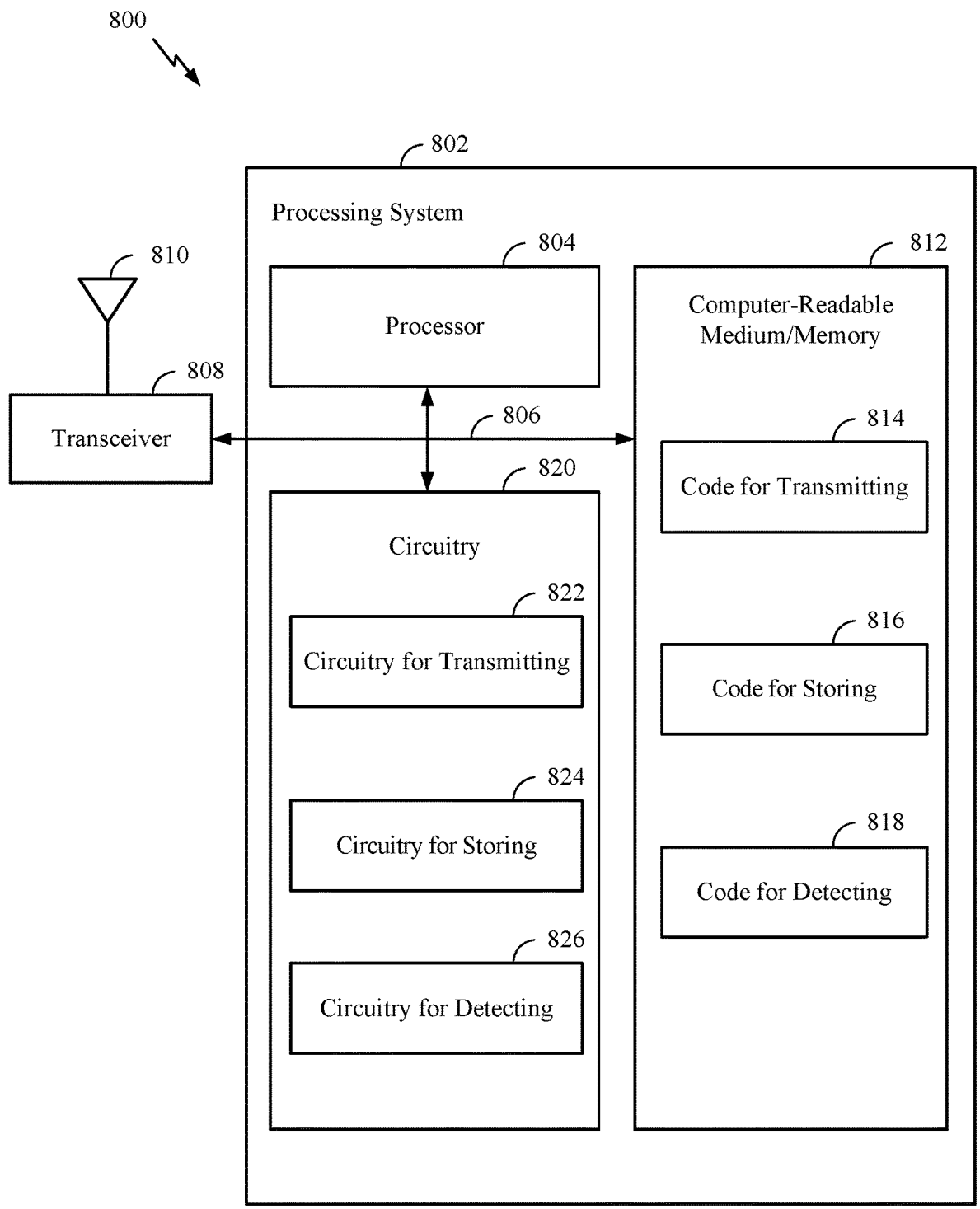
FIG. 8 illustrates a communications device (e.g., a UE) that may include various components configured to perform operations for the techniques disclosed herein in accordance with aspects of the present disclosure.

FIG. 8 illustrates a communications device 800 (e.g., the UE 120) that may include various components (e.g., corresponding to means-plus-function components) configured to perform operations for the techniques disclosed herein, such as the operations illustrated in FIG. 4. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations 400 illustrated in FIG. 4, or other operations for performing the various techniques discussed herein for providing RF exposure continuity after an exception event. In certain aspects, computer-readable medium/memory 812 stores code for transmitting 814, code for storing 816, and/or code for detecting 818. In certain aspects, the processing system 802 has circuitry 820 configured to implement the code stored in the computer-readable medium/memory 812. In certain aspects, the circuitry 820 is coupled to the processor 804 and/or the computer-readable medium/memory 812 via the bus 806. For example, the circuitry 820 includes circuitry for transmitting 822, circuitry for storing 824, and/or circuitry for detecting 826. In other aspects, the circuitry 820 is integrated with the processor 804.

Example Aspects

In addition to the various aspects described above, specific combinations of aspects are within the scope of the disclosure, some of which are detailed below:

Aspect 1. A method of wireless communication by a user equipment (UE), comprising: transmitting a first signal at a first transmission power based on time-averaged radio frequency (RF) exposure measurements over a time window; storing RF exposure information associated with the time window; detecting that an exception event associated with the UE occurred; and transmitting a second signal at a second transmission power based at least in part on the stored RF exposure information in response to the detection of the event.

Aspect 2. The method of Aspect 1, wherein storing the RF exposure information comprises periodically storing the RF exposure information.

Aspect 3. The method according to any one of Aspects 1 or 2, wherein storing the RF exposure information comprises storing the RF exposure information in a memory resistant to corruption from the exception event.

Aspect 4. The method according to any one of Aspects 1-3, wherein: storing the RF exposure information comprises: storing the RF exposure information with a timestamp corresponding to when a most recent time-averaged RF exposure measurement is generated, and obtaining the timestamp from a counter resistant to the exception event; and transmitting the second signal comprises transmitting the second signal at the second transmission power based at least in part on the stored RF exposure information in response to a determination that the timestamp of the RF exposure information is within the time window.

Aspect 5. The method according to any of Aspects 1-4, wherein storing the RF exposure information comprises storing the RF exposure information with a check value including a remainder in a cyclic redundancy check (CRC) of the RF exposure information.

Aspect 6. The method of Aspect 5, wherein transmitting the second signal comprises transmitting the second signal at the second transmission power based on supplementing time-averaged RF exposure measurements for a current time window with the stored RF exposure information in response to a determination that the CRC of the RF exposure information matches the check value.

Aspect 7. The method according to any one of Aspects 1-6, wherein transmitting the second signal comprises transmitting the second signal at the second transmission power based on supplementing time-averaged RF exposure measurements with the stored RF exposure information.

Aspect 8. The method of Aspect 7, wherein transmitting the second signal comprises transmitting the second signal at the second transmission power based at least in part on the stored RF exposure information when at least one RF exposure measurement is missing from a current time window.

Aspect 9. The method according to any one of Aspects 1-8, wherein the RF exposure information includes a sum of the time-averaged RF exposure measurements or separate values for each of the time-averaged RF exposure measurements.

Aspect 10. The method according to any one of Aspects 1-9, wherein the exception event includes at least one of an error, a reset, a crash, or a reboot affecting an operation of the UE or a modem used in transmitting the first and second signals.

Aspect 11. The method according to any one of Aspects 1-10, wherein the time-averaged RF exposure measurements comprise at least one of a time-averaged specific absorption rate (SAR) or a time-averaged power density (PD).

Aspect 12. The method according to any one of Aspects 1-11, wherein the transmitting the second signal is based on a determination of a type of the exception event.

Aspect 13. An apparatus for wireless communication, comprising: a transmitter configured to transmit a first signal at a first transmission power based on time-averaged radio frequency (RF) exposure measurements over a time window; a memory; and a processor coupled to the memory, the processor and the memory being configured to: store RF exposure information associated with the time window, and detect that an exception event associated with the apparatus occurred; wherein the transmitter is further configured to transmit a second signal at a second transmission power based at least in part on the stored RF exposure information in response to the detection of the event.

Aspect 14. The apparatus of Aspect 13, further comprising a modem coupled to the transmitter and the processor, the modem being configured to provide, to the transmitter, instructions on the first transmission power and the second transmission power.

Aspect 15. The apparatus according to any one of Aspects 13 or 14, wherein the processor and the memory are further configured to periodically store the RF exposure information.

Aspect 16. The apparatus according to any one of Aspects 13-15, wherein the memory is resistant to corruption from the exception event.

Aspect 17. The apparatus according to any one of Aspects 13-16, further comprising a counter configured to provide a timestamp and resistant to the exception event, wherein: the processor and the memory are further configured to: obtain the timestamp from the counter, and store the RF exposure information with the timestamp corresponding to when a most recent time-averaged RF exposure measurement is generated; and the transmitter is further configured to transmit the second signal at the second transmission power based at least in part on the stored RF exposure information in response to a determination that the timestamp of the RF exposure information is within a current time window.

Aspect 18. The apparatus according to any one of Aspects 13-17, further comprising a power management integrated circuit (PMIC), wherein the counter is integrated with the PMIC.

Aspect 19. The apparatus according to any one of Aspects 13-18, wherein the processor and the memory are further configured to store the RF exposure information with a check value including a remainder in a cyclic redundancy check (CRC) of the RF exposure information.

Aspect 20. The apparatus of Aspect 19, wherein the transmitter is further configured to transmit the second signal at the second transmission power based on supplementing time-averaged RF exposure measurements for a current time window with the stored RF exposure information in response to a determination that the CRC of the RF exposure information matches the check value.

Aspect 21. The apparatus according to any one of Aspects 13-20, wherein the transmitter is further configured to transmit the second signal at the second transmission power based on supplementing time-averaged RF exposure measurements with the stored RF exposure information.

Aspect 22. The apparatus of Aspect 21, wherein the transmitter is further configured to transmit the second signal at the second transmission power based at least in part on the stored RF exposure information when at least one RF exposure measurement is missing from the time window.

Aspect 23. The apparatus according to any one of Aspects 13-22, wherein the RF exposure information includes a sum of the time-averaged RF exposure measurements or separate values for each of the time-averaged RF exposure measurements.

Aspect 24. The apparatus according to any one of Aspects 13-23, wherein the exception event includes at least one of an error, a reset, a crash, or a reboot affecting an operation of the apparatus or a modem used in transmitting the first and second signals.

Aspect 25. The apparatus according to any one of Aspects 13-24, wherein the time-averaged RF exposure measurements comprise at least one of a time-averaged specific absorption rate (SAR) or a time-averaged power density (PD).

Aspect 26. The apparatus of Aspect 13 configured to perform the method of any of Aspects 1 through 12.

Aspect 27. An apparatus for wireless communication, comprising: means for transmitting a first signal at a first transmission power based on time-averaged radio frequency (RF) exposure measurements over a time window; means for storing RF exposure information associated with the time window; means for detecting that an exception event associated with the apparatus occurred; and means for transmitting a second signal at a second transmission power based at least in part on the stored RF exposure information in response to the detection of the event.

Aspect 28. The apparatus of Aspect 27, further comprising means for generating a timestamp, the means for generating the timestamp being resistant to the exception event, wherein: the means for storing the RF exposure information comprises: means for obtaining the timestamp from the means for generating the timestamp, means for storing the RF exposure information with the timestamp corresponding to when a most recent time-averaged RF exposure measurement is generated; and the means for transmitting the second signal comprises means for transmitting the second signal at the second transmission power based at least in part on the stored RF exposure information if the timestamp of the RF exposure information is within the time window.

Aspect 29. The apparatus of Aspect 27 comprising means for performing the method of any one of Aspects 1 through 13.

Aspect 30. A computer-readable medium storing computer-executable code thereon for wireless communications that, when executed by at least one processor, cause an apparatus to perform the method of any one of Aspects 1 through 12.

Aspect 31. The method according to any one of Aspects 1-12, wherein the transmitting the second signal at the second transmission power is based on a determination of a type of the exception event.

Aspect 32. The method according to any one of Aspects 1-12, wherein the transmitting the second signal at the second transmission power is based on a determination that transmission from the UE ceased during a portion of time corresponding to the exception event.

Aspect 33. The apparatus according to any one of Aspects 13-26, wherein the processor and the memory are configured to determine a type of the exception event, and wherein the transmitter is configured to transmit the second signal at the second transmission power based on the determination.

Aspect 34. The apparatus according to any one of Aspects 13-26, wherein the processor and the memory are configured to determine that transmission from the UE ceased during a portion of time corresponding to the exception event, and wherein the transmitter is configured to transmit the second signal at the second transmission power based on the determination.

Aspect 35. A method of wireless communication by a user equipment (UE), comprising: transmitting a first signal at a first transmission power based on time-averaged radio frequency (RF) exposure measurements over a time window; storing RF exposure information associated with the time window; detecting that an exception event associated with the UE occurred; determining that a timestamp corresponding to a most recent time-averaged RF exposure measurement is not within a current time window or determining that a check value does not pass a cyclic redundancy check (CRC) of the RF exposure information; and transmitting a second signal at a second transmission power in a failsafe mode based on the determining.

Aspect 36. The method of Aspect 35, comprising obtaining the timestamp from a counter resistant to the exception event.

Aspect 37. The method according to any one of Aspects 35 or 36, wherein the second transmission power is determined based on a transmission power or exposure being at a maximum over the duration of a prior portion of the current time window.

Aspect 38. The method according to any one of Aspects 35-37, wherein time-averaged RF exposure measurements for the current time window are not supplemented with the stored RF exposure information in the failsafe mode.

Aspect 39. An apparatus for wireless communication, comprising: a transmitter configured to transmit a first signal at a first transmission power based on time-averaged radio frequency (RF) exposure measurements over a time window; a memory; and a processor coupled to the memory, the processor and the memory being configured to: store RF exposure information associated with the time window, detect that an exception event associated with the apparatus occurred, and determine that a timestamp corresponding to a most recent time-averaged RF exposure measurement is not within a current time window or determine that a check value does not pass a cyclic redundancy check (CRC) of the RF exposure information; wherein the transmitter is further configured to transmit a second signal at a second transmission power in a failsafe mode based on the determination.

Aspect 40. An apparatus for wireless communication, comprising: means for transmitting a first signal at a first transmission power based on time-averaged radio frequency (RF) exposure measurements over a time window; means for storing RF exposure information associated with the time window; means for detecting that an exception event associated with the UE occurred; means for determining that a timestamp corresponding to a most recent time-averaged RF exposure measurement is not within a current time window or means for determining that a check value does not pass a cyclic redundancy check (CRC) of the RF exposure information; and means for transmitting a second signal at a second transmission power in a failsafe mode based on the determining.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells, and/or may be configured as a CPE. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to and/or configured as a mobile station, a terminal, an access terminal, a subscriber unit, a station, a CPE, a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:
    transmitting a first signal at a first transmission power based on time-averaged radio frequency (RF) exposure measurements over a time window;
    storing RF exposure information associated with the time window;
    detecting that an exception event associated with the wireless device occurred; and
    transmitting a second signal at a second transmission power based at least in part on the stored RF exposure information in response to the detection of the exception event and in response to a determination that the RF exposure information passes a reliability check.

2. The method of claim 1, wherein storing the RF exposure information comprises periodically storing the RF exposure information.

3. The method of claim 1, wherein storing the RF exposure information comprises storing the RF exposure information in a memory resistant to corruption from the exception event.

4. The method of claim 1, wherein:
    storing the RF exposure information comprises:
        storing the RF exposure information with a timestamp corresponding to when a most recent time-averaged RF exposure measurement is generated, and
        obtaining the timestamp from a counter resistant to the exception event; and
    transmitting the second signal comprises transmitting the second signal at the second transmission power based at least in part on the stored RF exposure information in response to a determination that the timestamp of the RF exposure information is within a current time window.

5. The method of claim 1, wherein storing the RF exposure information comprises storing the RF exposure information with a check value including a remainder in a cyclic redundancy check (CRC) of the RF exposure information.

6. The method of claim 5, wherein transmitting the second signal comprises transmitting the second signal at the second transmission power based on supplementing time-averaged RF exposure measurements for a current time window with the stored RF exposure information in response to a determination that the CRC of the RF exposure information matches the check value, wherein the passed reliability check includes when the CRC of the RF exposure information matches the check value.

7. The method of claim 1, wherein transmitting the second signal comprises transmitting the second signal at the second transmission power based on supplementing time-averaged RF exposure measurements with the stored RF exposure information.

8. The method of claim 7, wherein transmitting the second signal comprises transmitting the second signal at the second transmission power based at least in part on the stored RF exposure information when at least one RF exposure measurement is missing from a current time window.

9. The method of claim 1, wherein the RF exposure information includes a sum of the time-averaged RF exposure measurements or separate values for each of the time-averaged RF exposure measurements.

10. The method of claim 1, wherein the exception event includes at least one of an error, a reset, a crash, or a reboot affecting an operation of the wireless device or a modem used in transmitting the first and second signals.

11. The method of claim 1, wherein the time-averaged RF exposure measurements comprise at least one of a time-averaged specific absorption rate (SAR) or a time-averaged power density (PD).

12. The method of claim 1, wherein the transmitting the second signal is based on a determination of a type of the exception event.

13. An apparatus for wireless communication, comprising:
    a transmitter configured to transmit a first signal at a first transmission power based on time-averaged radio frequency (RF) exposure measurements over a time window;
    a memory; and
    a processor coupled to the memory, the processor and the memory being configured to:
        store RF exposure information associated with the time window, and
        detect that an exception event associated with the apparatus occurred;
    wherein the transmitter is further configured to transmit a second signal at a second transmission power based at least in part on the stored RF exposure information in response to the detection of the exception event and in response to a determination that the RF exposure information passes a reliability check.

14. The apparatus of claim 13, further comprising a modem coupled to the transmitter and the processor, the modem being configured to provide, to the transmitter, instructions on the first transmission power and the second transmission power.

15. The apparatus of claim 13, wherein the processor and the memory are further configured to periodically store the RF exposure information.

16. The apparatus of claim 13, wherein the memory is resistant to corruption from the exception event.

17. The apparatus of claim 13, further comprising a counter configured to provide a timestamp and resistant to the exception event, wherein:
    the processor and the memory are further configured to:
        obtain the timestamp from the counter, and
        store the RF exposure information with the timestamp corresponding to when a most recent time-averaged RF exposure measurement is generated; and
    the transmitter is further configured to transmit the second signal at the second transmission power based at least in part on the stored RF exposure information in response to a determination that the timestamp of the RF exposure information is within a current time window.

18. The apparatus of claim 17, further comprising a power management integrated circuit (PMIC), wherein the counter is integrated with the PMIC.

19. The apparatus of claim 13, wherein the processor and the memory are further configured to store the RF exposure information with a check value including a remainder in a cyclic redundancy check (CRC) of the RF exposure information.

20. The apparatus of claim 19, wherein the transmitter is further configured to transmit the second signal at the second transmission power based on supplementing time-averaged RF exposure measurements for a current time window with the stored RF exposure information in response to a determination that the CRC of the RF exposure information matches the check value, wherein the passed reliability check includes when the CRC of the RF exposure information matches the check value.

21. The apparatus of claim 13, wherein the transmitter is further configured to transmit the second signal at the second transmission power based on supplementing time-averaged RF exposure measurements with the stored RF exposure information.

22. The apparatus of claim 21, wherein the transmitter is further configured to transmit the second signal at the second transmission power based at least in part on the stored RF exposure information when at least one RF exposure measurement is missing from the time window.

23. The apparatus of claim 13, wherein the RF exposure information includes a sum of the time-averaged RF exposure measurements or separate values for each of the time-averaged RF exposure measurements.

24. The apparatus of claim 13, wherein the exception event includes at least one of an error, a reset, a crash, or a reboot affecting an operation of the apparatus or a modem used in transmitting the first and second signals, and wherein the time-averaged RF exposure measurements comprise at least one of a time-averaged specific absorption rate (SAR) or a time-averaged power density (PD).

25. The apparatus of claim 13, wherein the processor and the memory are configured to determine that transmission from the apparatus ceased during a portion of time corresponding to the exception event, and wherein the transmitter is configured to transmit the second signal at the second transmission power based on the determination.

26. A method of wireless communication by a user equipment (UE), comprising:

transmitting a first signal at a first transmission power based on time-averaged radio frequency (RF) exposure measurements over a time window;

storing RF exposure information associated with the time window;

detecting that an exception event associated with the UE occurred;

determining that a timestamp corresponding to a most recent time-averaged RF exposure measurement is not within a current time window or determining that a check value does not pass a cyclic redundancy check (CRC) of the RF exposure information; and transmitting a second signal at a second transmission power in a failsafe mode based on the determining.

27. The method of claim 26, comprising obtaining the timestamp from a counter resistant to the exception event.

28. The method of claim 26, wherein the second transmission power is determined based on a transmission power or exposure being at a maximum over a prior portion of the current time window.

29. The method of claim 26, wherein time-averaged RF exposure measurements for the current time window are not supplemented with the stored RF exposure information in the failsafe mode.

30. An apparatus for wireless communication, comprising:

a transmitter configured to transmit a first signal at a first transmission power based on time-averaged radio frequency (RF) exposure measurements over a time window;

a memory; and a processor coupled to the memory, the processor and the memory being configured to:
store RF exposure information associated with the time window,
detect that an exception event associated with the wireless device occurred, and
determine the RF exposure information is outside a current time window or
determine the RF exposure information fails a reliability check;

wherein the transmitter is further configured transmit a second signal at a second transmission power in a failsafe mode based on the determination.

* * * * *